No. 696,949. Patented Apr. 8, 1902.
C. B. DURYEA.
METHOD OF MAKING THIN BOILING STARCH.
(Application filed May 24, 1901.)
(No Model.)
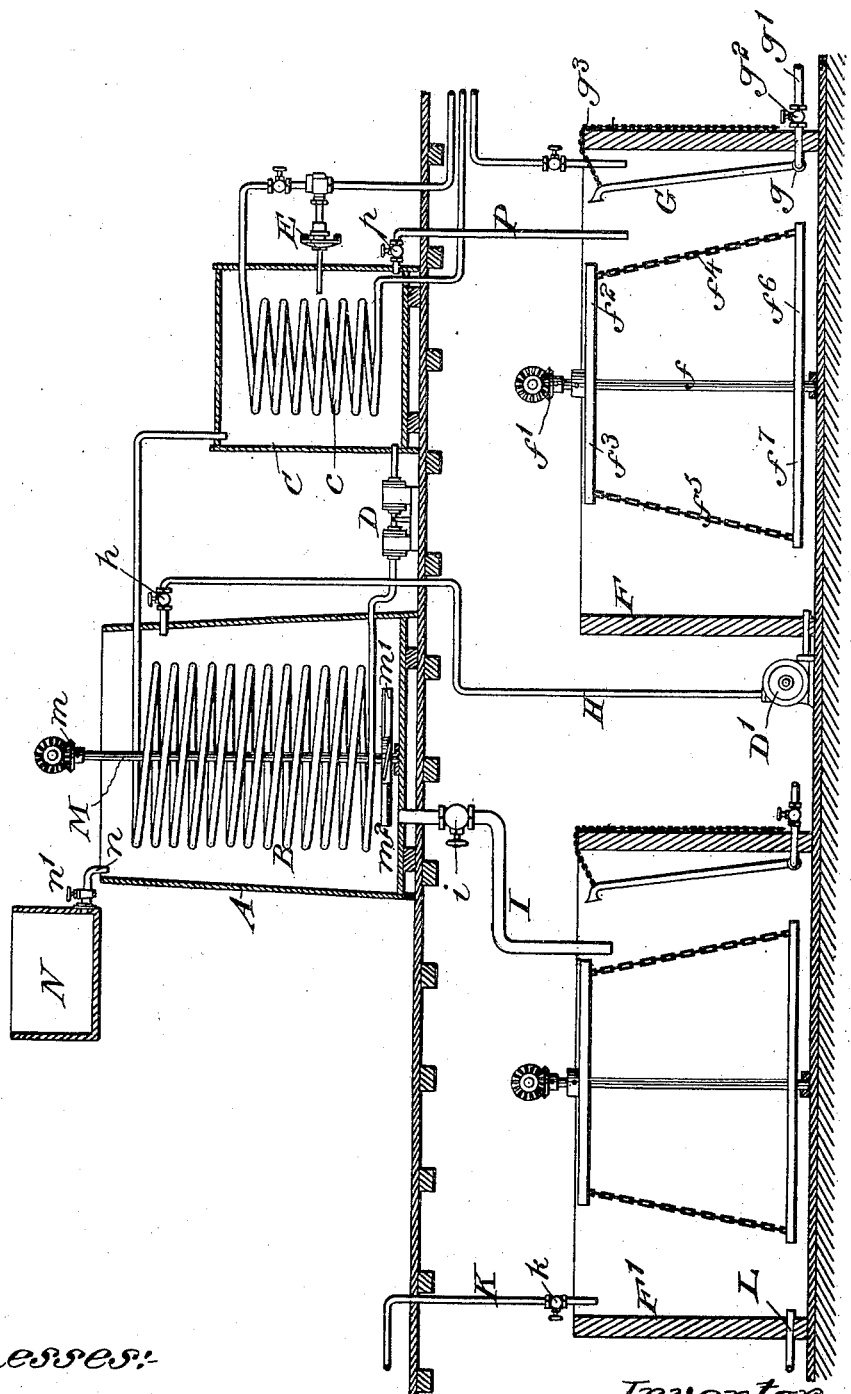
Witnesses:
George Barry Jr.
Henry Thieme
Inventor:
Chester B. Duryea
By Brown & Seward
his Attorneys

UNITED STATES PATENT OFFICE.

CHESTER B. DURYEA, OF NEW YORK, N. Y.

METHOD OF MAKING THIN BOILING STARCH.

SPECIFICATION forming part of Letters Patent No. 696,949, dated April 8, 1902.

Application filed May 24, 1901. Serial No. 61,738. (No specimens.)

*To all whom it may concern:*

Be it known that I, CHESTER B. DURYEA, a citizen of the United States, and a resident of the borough of Manhattan, in the city and State of New York, have invented a new and useful Improvement in Methods of Making Thin Boiling Starch, of which the following is a specification.

My invention relates to an improvement in the method of manufacturing thin boiling or modified starch, with the object in view of providing a high grade and uniform quality of starch of this character in an expeditious manner.
In my Patent No. 675,822, of June 4, 1901, I have shown, described, and claimed the method of making a thin boiling, now commonly known as "modified," starch, consisting in treating the starch mixed with water with acid while the starch is held in a free flowing state of suspension and maintained at a degree of temperature as high as practicable without breaking down the starch granules, and subsequently while the mixture is held in suspension removing the acid.

My present invention is directed more specifically to the manner of removing the acid while the mixture produced as heretofore is still held in suspension, with the object in view of economizing time in the complete removal of the acid.

With this object in view my present invention consists in treating the starch mixed with water with acid while the starch is held in a free flowing state of suspension and maintained at a degree of temperature as high as practicable without breaking down the starch granules and subsequently while the mixture is still held in suspension neutralizing the acid and finally drying.

The accompanying drawing represents a practicable embodiment of an apparatus for carrying my method into effect, the connected and coacting parts being shown in vertical section.

The method or process may be more specifically described as follows:

While not limiting myself to any particular starch, I will describe the process with reference to corn-starch, which may be extracted from the corn in any of the usual methods.

The starch to be operated upon may be taken at any stage of the usual starch process after the corn is ground and sieved—viz., after the starch is roughly separated from the coarser portions of the grain. In fact, the corn itself could be operated upon before grinding; but I prefer, in order to obtain a pure product and for reasons of economy, not to operate upon the starch until it has reached that stage of the ordinary process where the starch is ready for washing and drying—*i. e.*, where the starch has been to a great extent refined or separated from the nitrogenous, fatty, and cellular portion of the corn. The starch thus prepared is first put in suspension in water, which may be done by any convenient and ordinary method. It may be of any convenient specific gravity; but I prefer a gravity of about 14° Baumé or somewhat heavier. I also prefer to put the starch in suspension in warm water for reasons which will hereinafter be more particularly explained in connection with the explanation of the apparatus. In speaking of placing the starch "in suspension" I wish to be understood as intending that it shall be in what I am pleased to call a "free flowing state of suspension" as distinguished from a viscous or pasty mass. The next step in the process is making the water in which the starch is held in suspension acid to the extent of about one-half to two per cent., by weight, of free acid. This may be done either before or after the charge in the converter is raised to its efficient working temperature. I prefer to use sulfuric acid, although other acid—such, for example, as hydrochloric acid—might be used. I also prefer to remove the suspended starch from the vessel or tank in which it is first placed in suspension into a separate vessel, which I call for convenience the "converter," although this is not necessary, as the converter might be itself used for the purpose of first placing the starch in suspension. The per cent. of acid which I prefer in practice is about one per cent. While in the converter the starch is kept in suspension and the acid thoroughly distributed by continuous agitation and the temperature raised by simple heating means to about 55° centigrade. The exact temperature is not essential to the process; but it should not reach a point higher than 59° centigrade for corn-starch, because of the danger of seriously swelling and dissolving the starch; but the nearer the mass can be kept to 59° centigrade without materially exceeding that temperature the more rapid will the process be. As soon as the acid is added it begins action on the starch granule; but at ordinary temperatures the process would be much too slow for practical purposes, while if the acidified starch liquor is raised to between 55° centigrade and 60° centigrade the effect of the acid on the granules is rapid, completing in from about one-half to four and one-half hours the operation which at ordinary temperatures would require days and even weeks to complete. The time of conversion is not uniform for starch of different characters, but when operating on the same kind or character of starch the conversion time for any predetermined product will be the same for each succeeding charge in the converter when employing the same percentage of acid and the same uniform temperature. The operator may follow the progress of the operation by withdrawing the samples from the converter from time to time, filtering, cooling, and testing with a weak solution of iodin, and the intensity of the test when made under the same operative conditions will vary in proportion to the progress of the operation. A small amount of experience will enable the operator to stop the operation at the proper point. When this is reached, the heating is discontinued and the charge in the converter is submitted to neutralization with some suitable alkali, either in the converter itself or preferably in a separate vessel to which it is removed from the converter. The neutralization of the acid may be either partial or complete. Any suitable alkali may be used—such, for example, as soda-ash. When very weak acid has been used for the purpose of the conversion hereinabove particularly described, the alkali may be applied in the converter itself or in the vessel to which the charge has been withdrawn at the termination of the conversion. The moment the proper point of conversion is reached the charge, either with or without further washing, may be prepared for drying in any convenient manner, such as gathering by boxing or by the use of a centrifugal machine. When stronger acid is used, the charge on the completion of the conversion may be at once dropped into cold water contained in a suitable vessel, and after one or more washings the remaining acid may be neutralized by the use of alkali, as before, and with or without additional washing the starch may then be dried as usual. The first effect of the dilute acid is to penetrate without materially changing the character of the amylocellulose and attack the granulose, changing it in the first stage of the acid into merely a less viscous, more soluble, and a somewhat less colloidal modification. The first change is more of a physical than a chemical one. As the formula of starch is $n, (C_6H_{10}O_5,)$ this change may be expressed by saying that the value of $n$ has been decreased and that the size of the starch granulose molecules has become smaller. If the action of the dilute acid is allowed to continue the granulose will be broken down more and more until finally the changed granulose may be in this way extracted from the unbroken and practically unchanged cellulose, and as the viscous and colloidal character of starch paste is due mainly to the proportion and character of the granulose of the starch granules it is evident that the strong starch may be thus weakened without incurring any considerable loss of starch substance so long as the action of the acid is properly controlled.

Turning now to the apparatus which I prefer to employ for carrying the process into practical effect, A represents the converter, in which the starch is held in suspension while being treated with the acid, and the particular means for maintaining the temperature within the converter A at a predetermined degree is here shown as a pipe-coil B. The opposite ends of the pipe-coil B communicate directly with the interior of a closed hot-water tank C. A force-pump (shown diagrammatically at D) is connected with the pipe of the coil B in order to maintain the circulation of water from the tank C through the pipe-coil. The water in the tank C is maintained at the desired temperature, preferably by means of a steam-coil $c$ within the tank C, the control of the steam to the coil C from a source of supply (not shown) being determined by a thermostat or regulator E of any well-known or approved form.

A tank F for receiving the starch to be treated is provided with an agitator consisting in the present instance of an upright shaft $f$, provided with gear $f'$, driven from a source of power, (not shown,) and further provided with laterally-extending arms $f^2 f^3$, secured to rotate with the shaft and having suspended by chains $f^4 f^5$ at their opposite ends arms $f^6 f^7$, loosely connected with the shaft $f$. The tank F is further provided with a siphon draw-off tube G, pivotally connected at its lower end, as at $g$, with an exit-pipe $g'$, provided with a stop-cock $g^2$, the said draw-off tube G being suspended at its upper end by means of a chain or cord $g^3$ to permit its free open end to be lowered within the tank to draw off the liquid as far as desired.

From the tank F a pipe H leads to the converter A and is provided with a force-pump (shown diagrammatically at D') for forcing the contents or a portion of the contents of the tank F into the converter A at pleasure.

The force-pump D' is driven from a source of power. (Not shown.) The pipe H is provided with a stop-cock $h$.

A second tank F' for receiving the treated starch from the converter A is fitted with an agitator and draw-off tube in a manner quite similar to the tank F, hereinabove described.

A pipe I leads from the bottom of the converter A to the tank F', that is provided with a stop-cock $i$. The pipe K for the admission of water to the tank F' for washing the treated starch leads to the tank F' from a supply (not shown) and is provided with a stop-cock $k$. The tank F' is further provided with a draw-off pipe L.

The converter A is provided with an agitator comprising an upright shaft M, provided with gear $m$, by means of which it is driven from a source of power. (Not shown.) The shaft M is further provided in the present instance at a point below the coil B with blades $m'$ $m^2$, preferably made somewhat like propeller-blades, for the purpose of keeping the mass within the converter constantly and thoroughly agitated.

The acid may be contained in a properly-dilute state in a tank N, located conveniently with respect to the converter A, so that the proper charge may be drawn from the tank N through its spout $n$ into the converter A. A cock $n'$ is provided to control the flow of dilute acid into the converter.

The apparatus is practically operated as follows: The starch to be treated is put in suspension in water in the tank F, the water employed for this purpose being preferably drawn from the hot-water tank C through a pipe P, provided with a stop-cock $p$. The reason for using the warm water for putting the starch first in suspension is that it materially reduces the time required for raising the charge in the converter to the temperature of greatest efficiency. When the starch has become thoroughly commingled with the water in suspension and the lumps thoroughly broken up, a charge is forced by the pump D' from the tank F into the converter A. The temperature of the mass within the tank A is raised from 55° centigrade to 60° centigrade. The proper percentage of acid is then drawn from the tank N into the converter A, and the mass is kept thoroughly agitated and maintained preferably at as near 58° centigrade to 59° centigrade as possible by the action of the pump D forcing the hot water from the tank C through the coil B until the operation of the acid treatment is completed. The circulation of the hot water is then stopped, and the charge is drawn from the converter A into the washing-tank F, where it is washed one or more times with cold water drawn into the tank through the pipe K and neutralized. After the starch has been thoroughly washed enough clear water is introduced to cause it to flow through the exit-pipe L into the molds or driers, as is usual.

What I claim is—

The method of making a thin boiling or modified starch consisting in treating the starch, mixed with water, with acid while the starch is held in a free flowing state of suspension and maintained at a degree of temperature as high as practicable without breaking down the starch granules and subsequently, while the mixture is held in suspension, neutralizing the acid and finally drying.

In testimony that I claim the foregoing as my invention I have signed my name, in presence of two witnesses, this 23d day of May, 1901.

CHESTER B. DURYEA.

Witnesses:
 FREDK. HAYNES,
 GEORGE BARRY, Jr.